United States Patent [19] [11] 3,863,502
Elliott [45] Feb. 4, 1975

[54] VISUAL-TYPE HYGROMETER
[76] Inventor: Stanley B. Elliott, 7125 Conelly Blvd., Bedford, Ohio 44146
[22] Filed: Apr. 19, 1972
[21] Appl. No.: 245,550

Related U.S. Application Data
[62] Division of Ser. No. 18,921, March 12, 1970.

[52] U.S. Cl. .................... 73/336, 73/344, 73/356, 350/158
[51] Int. Cl. ............................................. G01w 1/06
[58] Field of Search ...... 73/339 R, 355 R, 355, 356, 73/336; 350/157, 158; 116/114 V

[56] References Cited
UNITED STATES PATENTS
2,597,589  5/1952  Matthias ............................ 350/157
3,453,434  7/1969  Katsumi Takami ............... 73/355 R OTHER PUBLICATIONS
Physics by Hausmann and Slack; pp. 706–708; copyright 1935, 1939.

Primary Examiner—Jerry W. Myracle
Assistant Examiner—Denis E. Corr
Attorney, Agent, or Firm—Baldwin, Egan, Walling & Fetzer

[57] ABSTRACT

A visual-type thermometer including a polarizer for a light beam and an analyzer for a light beam, and a chemical composition located between the polarizer and analyzer that is responsive to changes in relative humidity. A suitable chemical composition is an alkali metal salt of 3,3′, 4,4′-benzophenone tetracarboxylic dianhydride that is birefringent at a first relative humidity and nonbirefringent at a second relative humidity.

8 Claims, 6 Drawing Figures

PATENTED FEB 4 1975           3,863,502

VISUAL-TYPE HYGROMETER

This application is a division of my copending application Ser. No. 18,921, filed Mar. 12, 1970, entitled "Visual-Type Hygrometer".

This invention relates to a type of hygrometer in which changes of relative humidity (R.H.) are indicated visually. More specifically, birefringent crystals whose birefringence is sensitive to changes in relative humidity are displayed between a polarizer and analyzer so that changes in birefringence may be readily observed. By selection of suitable birefringent crystallizable compounds, whose birefringence either begins or terminates at various relative humidities, a series of highly visual displays may be readily assembled to comprise an efficient hygrometer.

There are many accurate hygrometers available whose operation depends on such factors as (1) the change in length of a hair or membrane as the R.H. varies, (2) the ability of a hygroscopic solution film to change its electrical resistance with changes in moisture content (R.H.) of the gas above it, (3) the ability of a hygroscopic polymeric sensor to change its electrical resistance with changes in R.H., and (4) the ability of a hygroscopic aluminum oxide film to change its electrical resistance with changes in R.H. There are various types of Psychrometers available, too, and these in general depend on determining the difference between "wet-bulb" and "dry-bulb" thermometer readings to indicate the R.H. of the gaseous environment. There are still other types which depend on electrolyzing the water in the gas stream in order to determine its concentration and thus the R.H. Still others depend on cooling the gas to determine its "dew point", a point which may be related to R.H. with suitable tables. However, all these devices are either mechanically complex, require special manipulation in order to get a reading require external power, or are delicate in nature. Though these limitations are generally tolerable, there is an acute need for what might be termed a "secondary hygrometer," one easily read, rugged, and independent of external power to serve as a warning device in case the complex devices malfunction. For humidity control is vital in an advanced civilization and great damage may occur if it fails.

There exists a simple, visual type of hygrometer based on the fact that certain cobalt compounds change color from blue to red as the humidity rises. This device is widely used of necessity. But it is very difficult to judge R.H. with any precision using this technique because of the subtle color shifts. Further, the change is of an unobtrusive nature and thus unsuitable for serving as a visual alarm.

Accordingly, one of the object of the present invention is to provide a visual-type hygrometer in which a number of delineated areas change sequentially from blue-black to brilliant white (or vice versa) as the R.H. rises.

Still another object of the invention is to provide a visual humidity alarm in which a relatively large area changes from blue-black to brilliant white (or vice versa) as the humidity varies from some desired range. In such a device suitable warning legends may appear to the viewer after the humidity has deviated from the desired range.

Another object of the invention is to provide a visual means of determining gas flow patterns in ducts, hoods, etc. by allowing suitably humidified gas to impinge on R.H.-sensitive birefringent crystals deposited on a substrate sandwiched between a perforated, spatially separated, polarizer and analyzer.

Another object of the invention is to provide a special type of hygrometer which can be used as a visual-type thermometer. Delineated areas, for example, may change sequentially from blue-black to brilliant white (or vice versa) as the R.H. falls (in response to a temperature rise) in a sealed system having a selected absolute moisture content.

As a variant of this, if an R.H.-sensitive compound which is birefringent at high humidities but non-refringent at lower humidities, is deposited on a suitable substrate and this is sealed into a double-pane window of the type used for insulating purposes, and the whole place between crossed polarizers, a temperature-sensitive system is obtained. When an appropriate absolute moisture content is sealed in, if direct sunlight falls onto the system the temperature rises, the R.H. drops sufficiently, birefringence ceases, and the system no longer transmits appreciable light.

Another object of the invention is to provide a visual-type moisture tester in which delineated areas change sequentially from blue-black to brilliant white (or vice versa) to indicate the R.H. of the system and thus, secondarily, the moisture content of the material being tested, as paper, tobacco or wood.

Additional objects and advantages of the visual-type hygrometer of the present invention will be apparent to one skilled in the art to which it pertains and upon reference to the following disclosure of several preferred embodiments thereof, and which are illustrated in the accompanying drawings, in which.

Figure 1:
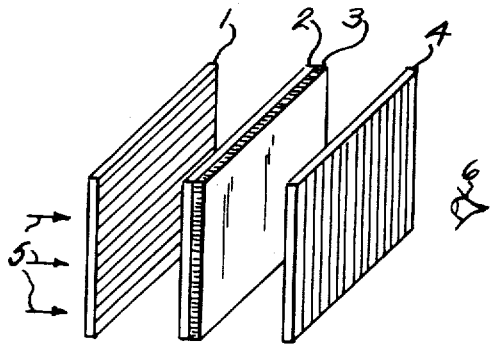
FIG. 1 is a view of a typical transmission-type system.

In a representative embodiment of the visual-type hygrometer of the present invention shown in FIG. 1, a light beam from light source 5 which may be a window, a tungsten lamp, a fluorescent lamp, etc. passes through Polaroid polarizer 1 where the light beam is polarized. The beam then passes through transparent or translucent substrate 2 which may be glass or some isotropic plastic such as cellulose triacetate, on which is deposited crystal layer 3. The beam passing through 2 and 3 then encounters Polaroid analyzer 4 whose polarizing axis is usually at right angles to the polarizing axis of 1 so as to result in what is generally termed a "dark field."

If the coating 3 on substrate 2 is in its non-birefringent mode, little light passes through analyzer 4 and the system appears dark-field to viewer 6. However, if the humidity changes sufficiently, coating 3 becomes birefringent. When a light beam enters a birefringent or, as it is sometimes called, double refracting material, it is divided into two components, one defined as an extraordinary ray and the other as an ordinary ray, each vibrating in a direction at right angles to the other and traversing the birefringent material with a different velocity to thereby introduce a phase difference therebetween. As said beam is thereby resolved into two components, one of which is retarded with respect to the other, said beam is generally referred to as being elliptically polarized. The two components emerging from the birefringent material and entering the second sheet of polarizing material 4 are resolved into one plane-polarized beam again. But a phase difference has been introduced between the two parts of this same beam, and so the necessary conditions for interference are present. With a white light source brilliant colors will emerge from analyzer 4 if the coating 3 crystalizes in large crystals. If the crystals are very small there is a mixing of colors and the crystal mass appears white. But in either case the field which was previously a blue-black passing very little light now glows brilliantly.

Figure 2:
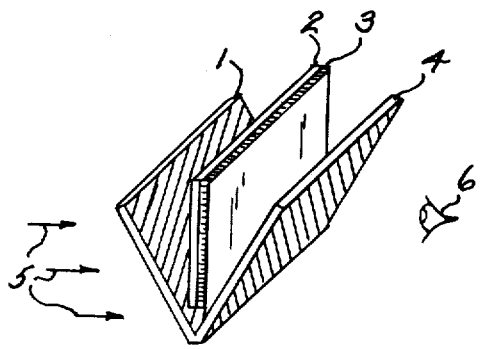
FIG. 2 is a view of a transmission-type system using a single piece of polarizing material.

FIG. 2 is essentially the same as FIG. 1 but better adapted to mass production in that a single piece of polarizing material is folded at 45° to its polarizing axis. This forms two leaves 1 and 4 whose polarizing axes are at right angles to one another and so create a darkfield condition when the viewer 6 interposes the folded layers between him and light source 5. A substrate 2 coated with R.H.-sensitive layer 3 is then inserted to create a R.H.-responsive sandwich. Or, if desired, the layer 3 may be coated on one or both inner surfaces of 1 and 4 so as to eliminate the need for a separate substrate.

Figure 3:
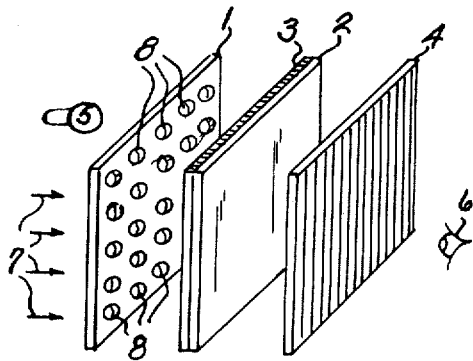
FIG. 3 is a view of a transmission-type system designed to most efficiently check the R.H. of a gas stream normal to the polarizer and analyzer.

FIG. 3 typifies a transmission-type system useful for checking the humidity (and uniformity of moisture and/or air distribution) of air emerging from ducts. Air stream 7 passes through apertures 8 pierced in Polaroid polarizer 1 illuminated by lamp 5. The air stream then encounters R.H.-sensitive layer 3 coated onto substrate 2. Viewer 6 scans the system through analyzer 4 to determine uniformity of birefringence.

Figure 4:
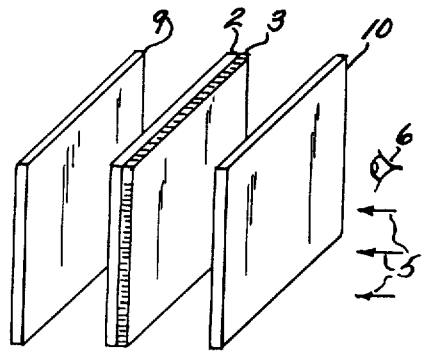
FIG. 4 is a view of a typical reflection-type system.

FIG. 4 typifies a reflection-type system in which light beams from a source 5 pass through polarizer 10 where they are polarized. They then pass through the R.H.-sensitive layer 3 coated on substrate 2 to the polarization-conserving mirror 9. The mirror reflects the beam back through the Polaroid 10 which now serves as an analyzer. As a variant of this system a circular polarizer may be used for 10 in place of the usual linear polarizer. Then, when the coating 3 is non-birefringent, no light will be reflected back through 10 because the circular polarizer has polarized the beam to a "right-handed" or "left-handed" helix form which cannot pass back through the circular polarizer 10. When coating 3 becomes birefringent, the polarization form of the light that is reflected from the mirror is altered and the returning light passes through the polarizer 10.

The hygrometers described may be used as "moisture meters" as well by simply taking care to enclose the hygrometer with the hygroscopic material whose moisture content is to be measured so that the salts may come to equilibrium with the atmosphere over the hygroscopic materials. Thus, a hygrometer may simply be buried in a product such as a grain and allowed to remain there long enough to equilibrate with the grain. In other cases, the product whose moisture content is to be tested is temporarily sealed into a container with the hygrometer until equilibrium is reached. In each case, of course, a chart must be prepared for the particular product relating R.H. over the product to the moisture contained in the product at that R.H. This chart is then consulted, knowing the R.H. reading, to determine the product's moisture content.

Figure 5:
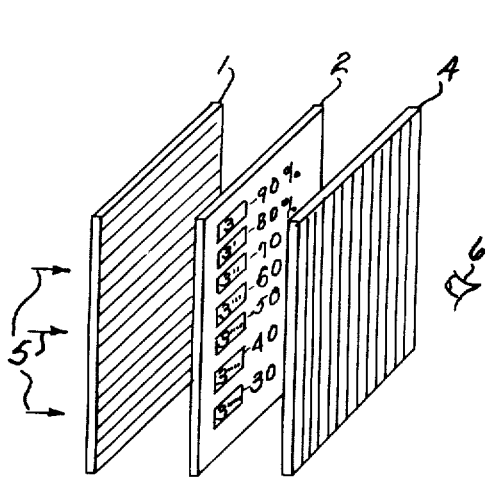
FIG. 5 is a view of a typical transmission-type system using sequential R.H. series of placques.

The substrate on which the R.H.-sensitive layer is deposited may be of a smooth material such as isotropic glass if the device is to be operated in the horizontal plane. However, when the device is vertical, the R.H.-sensitive layer, when it is in the liquid condition, may drain to the bottom of the plate under the influence of gravity. Under such circumstances, since roughening of the surface generally allows the solutions used to wet the substrate more thoroughly, placques may be sandblasted or etched into the substrate to give anchorage to the solutions and prevent their moving downwardly across the poorly wetting smooth surface. Such a unit is shown in FIG. 5 where the coatings, 3, 3', 3'', etc. are applied to etched areas on substrate 2.

To further control drainage problems the solutions of R.H.-sensitive compounds may be deposited in quite small areas, of circular shape, for example, either on smooth or etched spots on the substrate. These "droplets" may be "printed" onto the surface, for example, or they may be deposited by spraying through apertures in a mask over the substrate. The droplets of solution, analogous to the dots which comprise "half-tone" pictures, may be arranged to form placques, R.H. legends, warnings, etc.

Other methods may be used to create effective visual presentations of the R.H.-sensitive salt layers. Thus, very small glass beads of the type used in manufacturing reflective signs may be cemented to a substrate with a suitable cement, as for example an epoxy. The beads are spaced closely and insufficient adhesive is used to fill the interstices. Thus, a large number of small cavities are formed between the beads. R.H.-sensitive salt solutions may be deposited in these cavities to form visually effective displays as water evaporates and crystallization occurs.

R.H.-sensitive salt solutions may also be deposited in narrow channels or holes engraved into such substrates as transparent acrylic polymers. Such channels serve to hold the salt in its liquid form yet make effective displays when moisture has evaporated and birefringent crystals have formed. The channels may form numbers indicating the particular R.H. range of the salt filling the channels or may form rectangular display panels, etc.

The solutions of R.H.-sensitive compounds are desirably compounded with non-hygroscopic wetting agents to lower their surface tension so that they wet the chosen substrate. Since salts or other polar compounds are often selected for use as R.H.-sensitive compounds, the wetting agents are most suitably of a non-ionic form. Further, so as to secure effective but controlled wetting of the substrate, sufficient wetting agent is desirably compounded into the solution to obtain a surface tension near but not below the Critical Surface Tension of the substrate. That way a small contact angle is secured but wetting does not proceed spontaneously across the entire surface so as to cause drainage problems due to gravity.

Though generally good wetting is desired, in special cases poor wetting may be advantageous to create warning devices. Thus, a solution of an R.H.-sensitive compound having a naturally high surface tension may be sprayed onto a substrate in such a concentrated form that it dries almost immediately at the temperature and/or R.H. present under spraying conditions.

This R.H.-sensitive film on its carrier substrate may then be displayed in typical transmission- or reflection-type hygrometers where an evenly illuminated, birefringent surface is maintained so long as the R.H. remains below the critical point typical of the particular compound. Above the critical R.H., the hygroscopicity of the film removes moistures from the air and the birefringent crystals dissolve. The high surface tension of the solution then causes it to pull together into droplets. Thus, even if the dangerously high R.H. is subsequently lowered, a simple visual inspection of the film will reveal by the presence of droplets that the danger point was indeed passed. This type of signal is especially important, for example, in the storage of packaged equipment outdoors in the tropics where wide temperature variations can bring wide R.H. fluctuations inside the sealed package. Near the end of the life of enclosed dehydrating agents such as silica gel, the R.H. within the package can appear safely low at elevated daytime temperatures but it is actually dangerously high at lower night temperatures. The device just described maintains a round-the-clock watch for dangerously high humidities.

Compounds may be of the type which pass from a non-birefringent state to a birefringent state as the R.H. rises. One mechanism by which this can happen is believed to involve the formation of unstable hydrates which are birefringent. The birefringent hydrate is stable above a particular R.H. yet converts readily to a non-birefringent material of anhydrous form or of a lower degree of hydration as the R.H. drops below the critical moisture concentration. A good example of such a material is the tetrapotassium salt of 3,3'-4,4' benzophenone tetracarboxylic dianhydride which becomes birefringent at approximately 46% R.H. It continues birefringent until the R.H. rise to the place where deliquescence causes solution of the crystals with abrupt termination of birefringence. This occurs at approximately 65% R.H.

There are two basic types of compounds which are useful as the active agents in temperature- or R.H.-sensitive devices. The first type includes those compounds which are birefringent in the hydrated state but non-birefringent when anhydrous or when the water of hydration has dropped below a critical point.

There are a large number of compounds which exhibit birefringence when viewed between a polarizer and analyzer. Many of these compounds are hydrated as well. However, most of these materials are impractical for use as R.H. or temperature sensors because the water of hydration is bound so tightly into their structure. Once hydrated formations have been created, as from solution, water may be slowly driven out, but usually only through the use of impractically low humidities and excessively high temperatures. This, unfortunately, usually destroys the mechanical integrity of these tightly organized structures and a powder forms. That is, each crystal unit is so disrupted that it cannot easily be restored to its original coherent birefringent form by simply raising the relative humidity to the original level at which the hydrated material was stable. Thus, such polarized light devices as have been described here have not been feasible.

I have discovered a new class of compounds which make possible such visual sensors. I do not intend to be bound by theory, but it appears that films of such substances are characterized by submicroscopic openness of structure which allows water to readily move in and out of the system. That is, the hydrated, birefringent structure rapidly and easily forms under appropriate conditions, yet the anhydrous or less hydrated non-birefringent form is readily reconstituted when earlier conditions are reestablished.

The materials are the salts of relatively symmetrical compounds characterized by having at least two rings bearing carboxyl, hydroxyl, or sulfonic groups. The rings are joined by a bond or bonds or a type which, it is hypothesized, allow ring rotation around the bond so that bulky, nonplanar structures result. Ordinary planar molecules readily form compact, highly organized structures. However, it is believed that the molecules of this new class of compounds form crystal structures quite open to the passage of water molecules. In particular, these compounds comprise the alkali salts, pure or mixed, of molecules consisting of at least two rings bearing carboxy, hydroxy, or sulfo groups as substituents. The substituents may be on the same or separate rings.

Such groups as -OK, -OORb, and -SO$_3$Na furnish ions to hydrate, and these individual groups are highly polar. If such groups were asymmetrically distributed, molecules would result which had high dipole moments. On the other hand, even the most polar of groups, if balanced by other polar groups, may comprise part of a molecule which as a whole is substantially non-polar. By symmetrically distributing around the molecule polar groups possessing ions which can hydrate, I theorize that a structure is formed which can rather readily hydrate or dehydrate, for its individual molecules are not drawn into tight, intermolecular orientation by polar effects.

Summarizing, molecular configurations are not easily or precisely established. However, a wide range of molecular shapes can be expected, depending on the general configuration and the type and placement of substituent groups, ranging from molecules in which the rings are almost planar (little bulkiness) to those in which the rings are highly non-planar (high bulkiness). Although not wishing to be bound by theory, it is believed that water of hydration moves in and out of molecular aggregates of the former molecules which can be tightly packed with considerably more difficulty than with the latter. Putting it another way, a relatively low driving force (such as low water vapor pressure) is adequate to move water to the alkali metal ions of an open structure salt, everything else being equal, as compared with a tight structure.

The best compounds that are birefringent at a first relative humidity and non-birefringent at a second relative humidity are alkali metal salts of 3,3', 4,4'-benzophenone tetracarboxylic dianhydride and alkali metal salts of 1,1,3-trimethyl-5-carboxy-3-(p-carboxyphenyl) indan. The molecular structure of each is given below along with the approximate relative humidity at which certain alkali metal salts thereof become birefringent:

Alkali Metal Salts of 1,1,3-Trimethyl-5-carboxy-3-(p-carboxyphenyl) Indan

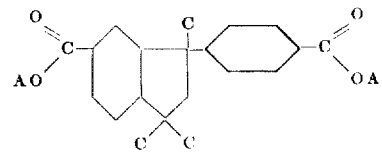

where A = an alkali metal
Relative Humidities of the Alkali Metal Salts:
Li$_2$ salt = 74%
Na$_2$ salt = 62%
K$_2$ salt = 53%
Rb$_2$ salt = 45%
Alkali Metal Salts of 3,3'4,4'Benzophenone Tetracarboxylic Dianhydride

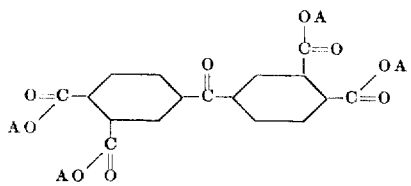

where A = an alkali metal
Relative Humidities of the Alkali Metal Salts:
Li$_4$ salt = 68%
Na$_4$ salt = 57%
K$_4$ salt = 43%
Rb$_4$ salt = 20%

In general the alkali metals include sodium and potassium which are preferred for convenience and economy, as well as lithium, rubidium and cesium.

Although not as good as the above described alkali metal salts of the indan and benzophenone compounds, a preferred composition is the alkali metal salts of napthochrome green, the disodium salt thereof being birefringent at a relative humidity of about 84%.

Other suitable compositions are alkali metal salts of 1,1' binaphthyl 8-8' dicarboxylic acid. The Na$_2$ salt begins to display birefringence at about 53% relative humidity at 70°F. The sodium salt was stroked to induce crystallization and after repeated cycling, the birefringence tended to become irreversible. The K$_2$ salt did not crystallize so that there was no observation.

Other suitable compositions are alkali metal salts of benzophenone 4,4'-dicarboxylic acid, the sodium salt beginning birefringence at about 96% relative humidity, the potassium salt beginning birefringence at about 85% and the rubidium salt beginning at about 75%.

The following list contains suitable alkali metal salts of compounds that were tested and indicates the approximate temperature in °F. below which the alkali metal salt is birefringent:

| Compound | Alkali Metal | Temperature °F. | Remarks |
|---|---|---|---|
| 3,3-Bis-(4-hydroxyphenyl) oxindole | K$_2$ | 254 | Was stroked to induce birefringence which became irreversible after a few cycles. |
| 2,4' Benzophenone dicarboxylic acid | K$_2$ | 176 | Glassy film first forms (non-birefringent) which subsequently crystallizes, making observation possible. |
| o-Benzoyl benzoic acid | K | | |
| | Na | 300 | No dehydration at 300° (no cessation) of birefringence) |
| | Rb | | No dehydration at 300° (no cessation of birefringence) Films difficult to observe because glassy film crystallizes with difficulty. Considerable background birefringence present with K salt above 300°F. |
| 2,4,4'-Trihydroxy benzophenone | K$_3$ | 220 | Required thin film for dehydration to occur. |
| 2-Hydroxy-4,-methoxy-benzophenone-5-sulfonic acid | K$_2$ | 275 | No stroking required to induce birefringence. |
| 2-Hydroxy-4-methoxy-benzophenone | K | 122 | Stroking required to induce birefringence of film. |
| 2,2'-Dihydroxy-4,4' dimethoxy benzophenone | K$_2$ | 250 | |
| 2-(-hydroxybenzoyl)-Benzoic acid | K$_2$ | 221 | |
| 2,2' Dihydroxy benzophenone | K$_2$ | 250 | |
| o-Hydroxybenzophenone | K | 113 | |
| 4,4' Dihydroxybenzophenone | K$_2$ | 260 | |
| Chlorobenzoyl benzoic acid | K | 290 | Tends to form considerable background birefringence on cycling. |
| 2,4 Dihydroxybenzophenone | K$_2$ | | No dehydration (no cessation of birefringence) at 300°F. |
| Sodium 2,2'-dihydroxy-4,4'-dimethoxy-5-sulfobenzophenone | Na | | No cessation of birefringence at 300°F. |
| | NaK$_2$ | | No cessation of birefringence at 300°F. |

—Continued

| Compound | Alkali Metal | Temperature °F. | Remarks |
|---|---|---|---|
| 2,2',4,4'-Tetrahydroxy benzophenone | $K_4$ | | No dehydration (no cessation of birefringence at 300°F.) |
| Phenol red | K | 150 | |
| p,p' Biphenol | $K_2$ | 290 | Thin layers required for dehydration and cessation of birefringence. Residual birefringence persists after major dehydration. |
| o,o' Biphenol | $K_2$ | 194 | |
| 2,2' Diphenic acid | $Rb_2$ | 240 | |
| | $K_2$ | | No dehydration (no cessation of birefringence apparent at 300°F.) |
| 4-Biphenylcarboxylic acid | K | | No dehydration (no cessation of birefringence at 300°F.) |
| 1,1'-Bi-2-naphthol | $K_2$ | | No dehydration (no cessation of birefringence at 300°F.) |
| 4,4' Biphenyldisulfonic acid | K | | No dehydration (no cessation of birefringence at 300°F.) |
| | $Rb_2$ | | No dehydration (no cessation of birefringence at 300°F.) |
| Phenolphthalein | K | 169 | In conc. soln. approx. 100% more KOH required than theo. for $K_3$ salt to form salt capable of birefringence. Even then stroking of film required to align molecules and so develop birefringence. |
| Bisphenol A | $K_2$ | 266 | Tended to gradually form birefringent crystals which would no longer dissociate on heating. |
| Bishydroxy coumarin, (3,3'-methylenebis [4-hydroxy coumarin]) | $K_2$ | 150 | |
| | $K_4$ | 150 | |
| Methylene disalicyclic acid | $K_2$ | 255 | Tended to form glassy film |
| | $K_4$ | 255 | |
| Benzilic acid | K | | No dehydration at 300+F. |
| | Rb | | Strong crystal formation of high birefringence. |
| Diphenyl acetic acid | K | 290 | Slow dehydration with strong residual background birefringence. |
| Dichlorophene [2,2'-methylenebis-(4-chlorophenol)] | $K_2$ | | No dehydration at 300°F., i.e., no cessation of birefringence. Highly crystalline birefringent film. |
| 6,6 Bis-(p-hydroxyphenyl)-3-(1-hydroxy 1-methyl ethyl)-heptanoic acid gamma lactone | $K_3$ | | No dehydration at 300°F. |
| Hexachlorophene, [2,2' methylenebis-(3,4,6-trichloro-2-hydroxyphenyl) methane] | $K_2$ | | No hydration at 300°F., i.e., no cessation of birefringence. |
| Diphenolic acid | $K_3$ | | No dehydration at 300°F., i.e., no cessation of birefringence. |
| Pamoic acid | | | When both-COOH or both-COOH plus-both -OH's neut., no dissociation observed at 300°F., i.e., no cessation of birefringence. |

| Compound | Alkali Metal | Temperature °F. | Remarks |
|---|---|---|---|
| 2,6-Divanillyli-denecyclohexanone | K$_2$ | 254 | Salts tended to form glasses which crystallized with great difficulty. |
| 4',5,7-Trihydroxy flavenone | K$_3$ | | No dehydration (no cessation biref.) at 300°F. |
| 4,4' Oxydiphenol | K$_2$ | | No dehydration (no cessation biref.) at 300°F. |
| 2,2'-Thiobis (4,6-dichlorophenol) | K$_2$ | 290 | Heavy residual birefringence after 290° reached. |
| 2,2' Dithiodibenzoic acid | K$_2$ Na$_2$ | 230 | No crystallization. Crystallization only slowly occurring. Heavy residual birefringence after 230°F reached. |
| Dihydroxy-diphenyl sulfone | K$_2$ | 240 | Residual birefringence after 240°F. reached. |
| 5,5 Thiodisalicyclic acid | K$_2$ | | No dehydration (no cessation birefringence at 300°F. |
| | K$_4$ | | Same as K$_2$ Salt. |

There is another factor having to do with the choice of molecular configurations which is of importance in the design of R.H.- or temperature-sensors having maximum industrial utility. As noted before, it is believed that the substituent groups contribute to positioning the rings in bulky, open configurations, the degree of bulkiness depending in part on the substituents. However, though the molecules may be unorganized when dissolved in the solution from which they are to be deposited, powerful intermolecular forces come into play as water evaporates and the molecules are forced more closely together. Observation suggests that some molecules of the type found effective are able to totally resist being forced into close, tight molecular groupings during evaporation of water. For the dehydrated material shows no birefringence after thousands of dehydration-hydration cycles. Other molecules, however, develop what might be termed a "background-haze," a partial birefringence in the dehydrated form when observed in polarized light. Sometimes this haze develops immediately, sometimes it develops on repetitive cycling through the phases of "dehydrated solid/hydrated solid/dehydrated solid."

It is thought that this haze develops because a small proportion of the molecules succumb to intermolecular organizing forces since the rings have a considerable degree of rotational freedom in spite of the effect of the substituent groups. Thus, chance may bring some molecules into a tightly organized, birefringent microcrystal which is not readily disrupted even by deliquescence. As noted before, some molecular structures are entirely free of this hazing tendency and these are preferred for use in indicating devices. For though the presence of background haze does not prevent those compounds from being used as indicators, the effect is more dramatic when the field changes from blue-black to great brilliance or vice versa.

This tendency of certain molecular species to succumb to organization forces and so pass from the isotropic to the birefringent state under particular conditions may be put to valuable industrial use. In particular, it has been found that some species (for example, the alkali salts of 1,1,3-Trimethyl-5-carboxy-3-(p-carboxyphenyl)indan as recorded in Table 1) are highly stable in the anhydrous (or minimum hydration) state, which is characterized by its isotropic nature when viewed between crossed Polaroids. However, when the ambient R.H. passes the critical level at which the compound hydrates and becomes birefringent, organizational forces begin to operate. In a very limited time, varying from a few hours to a couple of days, a new essentially irreversible birefringent crystal structure develops. Thus, even though the R.H. subsequently drops below the critical R.H. at which birefringence originally began, the film remains permanently birefringent.

This "memory" feature of certain molecular structures is invaluable. For, as noted elsewhere, there are many industrial areas where cyclical changes in R.H. occur and where it is desired that critical humidities (as that at which fungi development begins) are not exceeded. The compounds just described are excellent as inexpensive visual alarms, inactive indefinitely below the critical R.H., but ready to respond promptly and to hold their message for the next viewing observer.

There is another factor besides the intrinsic bulkiness of the cyclic organic structures which affects the openness of the final film. This has to do with the bases selected to neutralize acidic molecules. For since the atomic volumes and structures of the different cations selected to combine with the organic molecules described vary, the spatial arrangement of the total molecules of which they come to comprise a part also is affected. This in turn modifies how the molecules join other similar molecules to form a macro-structure. Thus, various cations may be selected depending on the nature of the opposite ion of high bulkiness and complexity. By judicious selection of anions and cations, compounds can be prepared which hydrate and dehydrate with varying degrees of ease. This, in turn, means that substances are available for use as sensitive agents to indicate visually, when the compounds are deposited on suitable substrates and viewed with polarized light, the existence of various relative humidity levels or temperatures.

At a certain temperature, what decides whether a particular compound gains or loses water is the pressure of water vapor around the molecule. Most hygrometers are used within a relatively narrow temperature band of perhaps 40° to 95°F. in areas where the R.H. is relatively high. Thus, structures are needed in which the water of hydration is loosely bound. Suitable compounds are shown in Table 1, together with the % R.H. at which birefringence begins if the R.H. is rising, or terminates if the R.H. is dropping, in the case of low mass deposits of the type used in these sensors. Since the alkali metals form isomorphous series of compounds, the R.H. response of the particular hygrometric series is controlled by using varying mol ratios of of alkali metals as the cations.

TABLE 2

% Relative humidity vs. Air Temperature
(70 grains moisture/lb. dry air)

| Temp. °F. | % R.H. | Temp. °F. | % R.H. |
|---|---|---|---|
| 70 | 65 | 150 | 6 |
| 80 | 46 | 160 | 5 |
| 90 | 34 | 170 | 4 |
| 100 | 25 | 180 | 3 |
| 110 | 18 | 190 | 2.5 |
| 120 | 14 | 200 | 2.0 |
| 130 | 10 | 210 | 1.6 |
| 140 | 8 | 220 | 1.4 |

Essentially, because of the relatively broad limits

TABLE 1

Birefringent, Labile Hydrates Having Sequential R.H. Response

| R.H. at which birefringence begins | Anion | Cation A/B | Mol % Cation A Mol % Cation B |
|---|---|---|---|
| 74.26 | 1,1,3-Trimethyl-5-carboxy-3-(p-carboxyphenyl) indan | Li/- | 100 |
| 71.7 | do. | Li/Na | 75/25 |
| 70.2 | do. | Li/Na | 50/50 |
| 67.2 | do. | Li/Na | 25/25 |
| 63.1 | do. | Na/- | 100 |
| 62.5 | do. | Na/K | 75/25 |
| 60.6 | do. | Na/K | 50/50 |
| 57.6 | do. | Na/K | 25/25 |
| 53.2 | do. | K/- | 100 |
| 50.7 | do. | K/Rb | 75/25 |
| 49.5 | do. | K/Rb | 50/50 |
| 47.3 | do. | K/Rb | 25/75 |
| 45.1 | do. | Rb/- | 100 |
| 69.4 | 3,3',4,4' Benzophenone Tetracarboxylic Dianhydride | Li/- | 100 |
| 67.5 | | Li/Na | 75/25 |
| 66.0 | | Li/Na | 50/50 |
| 62.5 | do. | Li/Na | 25/75 |
| 58.6 | do. | Na/- | 100 |
| 55.9 | do. | Na/K | 75/25 |
| 53.2 | do. | Na/K | 50/50 |
| 49.8 | do. | Na/K | 25/75 |
| 43.0 | do. | K/- | 100 |
| 39.1 | do. | K/Rb | 75/25 |
| 32.2 | do. | K/Rb | 50/50 |
| 25.0 | do. | K/Rb | 25/75 |
| 18.0 | do. | Rb/- | 100 |

Industrially, besides the need for simple hygrometers, there is a need for simple, visual thermal indicators which can be of large surface area for high recognition value. These indicators may be used to guard thermally-sensitive equipment, to indicate through a viewing aperture the temperature of gases in spaces such as ducts and environmental rooms, to indicate temperature distribution over relatively large areas as in the design of electric irons and hotplates, etc. Such indicators and alarms are usually required to operate at somewhat elevated temperatures, in particular above 100°F. For such applications, indicating compounds are desired in which the water is relatively tightly bound since the pressure of water vapor in open air which has been heated to a high temperature is quite low. The rapid drop in R.H. as the temperature is raised is shown in Table 2.

which typify simple alarm systems, the ambient relative humidity, which indicates the vapor pressure of water (or the back-pressure which is operating to prevent the hydrate from dissociating), can be considered as a constant at relatively high temperatures. Thus, one can measure the temperature at which various hydrates cease birefringence with the knowledge that variations of ambient R.H. (at room temperature) will have little effect on the temperature at which birefringence ceases. Table 3 lists various compounds together with the temperature at which birefringence ceases.

Other compounds may be used advantageously in assembling a suitably responsive series. Among the compounds whose alkali metal salts are appropriately responsive at various temperatures are the following:

p,p Biphenol
2,2' Diphenic acid

TABLE 3

Compounds and Temperature at Which Birefringence Ceases

| | Compounds | Temp. °F. |
|---|---|---|
| Potassium Salt of | o-Hydroxybenzophenone | 113 |
| do. | 2-Hydroxy-4-methoxy-benzophenone | 122 |
| do. | Phenol red | 151 |
| do. | 2,4' Benzophenonedicarboxylic acid | 176 |
| do. | o,o'-Biphenol | 194 |
| do. | 2-(p-Hyddroxybenzoyl)-benzoic acid | 221 |
| do. | 2,2'-Dihydroxy-4,4'-dimethoxy-benzophenone | 250 |
| do. | o-Benzoyl benzoic acid | 300 |

Phenolphthalein
Bisphenol A
Bishydroxycoumarin
Methylene disalicyclic acid
2,4,4'-Trihydroxy-benzophenone
2,2' Dihydroxybenzophenone
4,4' Dihydroxybenzophenone
2-Hydroxy-4-methoxy-benzophenone-5-sulfonic acid
3,3-Bis-(4-hydroxyphenyl)-oxindole
2,6-DivanillylidenecycloHexanone These labile compounds can also perform the industrially useful task of serving as detectors of various types of radiation. Thus, either pure compounds or those compounded with dyestuffs, for example, to make them highly absorbent to a selected band of radiation, can serve as radiation detectors. Further, to increase the sensitivity the compounds may be mounted onn substrates which absorb the radiation to be visually detected.

A wide variety of materials absorb acoustical and electromagnetic radiation of various wavelengths. Usually a portion of the absorbed radiation is converted to kinetic energy resulting in a rise in temperature of the material and its surroundings. Infra red heating panels and microwave heating ovens typify industrial applications of varying radiation bands. As part of the intelligent application of various types of radiation, it is desirable to rapidly determine the distribution of radiation, whether it is emanating directly from an infra red panel or an ultrasonic cleaning tank transducer, or perhaps is emitting from a distant radiation source and focused by a radiation-transmitting lens. For such detection large, easily observed radiation detection panels are most useful. Very much as with a humidity sensor, birefringent, highly labile hydrates may be disposed on a suitable substrate between crossed polarizers. As the compounds and/or substrate absorb radiation, the temperature of the materials and the overlying gas rises with an accompanying dissociation of the hydrates and cessation of birefringence. To make the system more sensitive, the polarizing sheets, sensitive compound, and substrate may comprise a sealed system. The R.H. of the encapsulated gas is preferably selected to be close to the critical humidity at which birefringence ceases at the ambient temperature of operation. Thus, only a small amount of absorbed radiation will cause a temperature rise, reduction of the R.H. of the gas, evaporation of the water of hydration and cessation of birefringence. Less sensitive than the system described is one based on the appearance of birefringence in compounds which had ceased birefringence because they had deliquesced.

Many variants of these practices are possible, of course. Thus, referring to FIG. 1 again, flexible substrate 2 on which is deposited crystal layer 3 might be in roll form so that the hydrated crystal layer and substrate might unroll under and close to a heated, laterally-moving stylus in a recording instrument. Thus, a narrow line of non-birefringent, dehydrated crystals would form under the heated stylus. On passing between polarizer 1 and analyzer 4 a "curve" would be observed to have been drawn by the stylus. This curve will be permanent if the substrate/crystal is stored below a certain critical R.H. But the curve may be obliterated and the film used again by simply exposing the film to a high humidity to rehydrate the previously dehydrated crystals.

For use in the applications described I have discovered a vital type of addition agent for compounding with the materials described. This type of agent includes a number of inorganic compounds of high surface area having little or no intrinsic birefringence. When these materials are added to solutions of the active organic compounds already described, a new sensitivity to changes of humidity is observed in the dried droplets or films deposited from such suspensions. This is of great industrial importance since it is often essential to rapidly ascertain shifts in R.H. Indeed, many mechanical R.H. meter manufacturers state the time in which their devices will move a certain proportion of the way toward a new R.H. reading when the R.H. has shifted. Using these high surface area agents, only a few seconds are required for a sensor film to come to a new equilibrium when the R.H. has shifted. Further, much higher driving force (lower R.H.) is reuqired to dehydrate the films so that birefringence ceases if the high surface area agents are not used. Table 4 shows graphically the new sensitivity contributed by these agents.

These same compounding agents are additionally useful in that they render the thickness of the deposited sensitive film non-critical. Some types of molecular structures, when deposited in a pure, uncompounded form in thick layers, have been observed to continue in the birefringent mode when hydrated, even though the humidity was subsequently reduced far below the point

TABLE 4

% R.H. at Which Birefringence Ceases (Due to Dehydration) When High Surface Area Compounding Agents Are Used ($Rb_2$ Phenylindan Dicarboxylate is R.H.-sensitive Compound)

| Compounding Agent | Agent Area M./gr. | gr. Agent/ 1 gr. Rb Salt | % R.H. Birefringence Ceases |
|---|---|---|---|
| None | — | — | 42.7 |
| Diatomaceous Earth | Relatively Low | 1.00 | 43.0 |
| Pyrogenic Silica | 200 | 0.30 | 45.2 |
| Pyrogenic Alum.Oxide | 100 | 0.60 | 45.2 |
| Pyrogenic Mixed Silica/ Alum. Oxide (14% $Al_2O_3$) | 150 | 0.45 | 46.0 |
| Precipitated Silica | 370 | 0.16 | 46.0 |
| Pyrogenic Mixed Silica/ Alum. Oxide (1.3% $Al_2O_3$) | 50 | 1.20 | 51.5 |
| do. | 80 | 1.00 | 51.5 |
| do. | 170 | 0.50 | 51.5 | at which they should have given up their water. The great thickness (compared with molecular dimensions) apparently stabilizes the system. Use of high surface area compounding agents reduced or eliminated this phenomenon of thickness-dependency. It is theorized that the sensitive molecules distribute themselves over the high surface of the added solids so that, in effect, two-dimensional structures are exposed to the air.

Earlier I stated that there are two basic types of compounds which are useful as the active agents in temperature- or R.H.-sensitive devices. I have now described the first type and the structures required in detail. The second type which is equally useful has already been mentioned. It includes those compounds which are birefringent in the solid state and which deliquesce so that the birefringent crystals cease birefringence due to solution once a critical R.H. has been exceeded. In particular, I have found that the materials which are suitable for use as indicators are those chemical compounds which form birefringent crystals and whose saturated solutions have vapor pressures between 1.0 and 17.5 mm. of mercury at 68°F.

I have further found that those same substances which have little or no birefringence but which possess high surface area are highly useful agents when used with the second type of compound. For once again they greatly improve the sensitivty of the materials to small changes in R.H. As before, they are advantageously mixed with the solution of the sensitive compound before it is deposited on a substrate.

As before, I choose to deposit the active materials in layers, droplets, channels and interstices so that the thickness of the layer does not greatly exceed about 0.1 mm and preferably does not exceed about .05 mm. This then insures adequate brilliance of the visual display yet minimizes the time lag due to the diffusion of water into or out of the indicator layer or particles. In general, the thickness of the coating containing the birefringent composition should be at least about 0.001 millimeter and preferably is at least about 0.005 mm.

In use, as the R.H. rises a particle of deposited material absorbs water and finally dissolves. As the R.H. continues to rise the droplet of solution increases in volume but maintains its structural integrity and location on the substrate. As the R.H. decreases, water is given up by the droplet and at the key point birefringence appears again. Thus, when such droplets are disposed for viewing in a polarized light field, they comprise an effective R.H. indicator. A series of compounds may be selected whose birefringence terminates due to dissolution as the R.H. increases. Thus, a typical series can be prepared from the following compounds:

TABLE 5

| % R.H. | Compound |
|---|---|
| 30 | Potassium Salt of Levulinic Acid |
| 40 | Potassium Salt of Phthalic Acid |
| 50 | Potassium Salt of Succinic Acid |
| 60 | Potassium Salt of Adipic Acid |
| 70 | Potassium Salt of 1,2,4,5 Benzenetetracarboxylic Acid |
| 80 | Potassium Salt of Fumaric Acid |
| 90 | Potassium Salt of o-Benzoyl Benzoic Acid |

This happens to be a series of potassium salts, but many other compounds may be used, depending on the R.H. range to be covered. Table 6 shows another series of suitable chemical compounds, selected from sodium and potassium salts for reasons of economy and availability.

TABLE 6

| % R.H. | Compound |
|---|---|
| 35 | Dipotassium Salt of Tetrahydrophthalic Acid |
| 40 | Potassium Salt of Crotonic Acid |
| 46 | Dipotassium Salt of Maleic Acid |
| 50 | Sodium Salt of 4-Chlorophthalic Acid |
| 60 | Dipotassium Salt of Azelaic Acid |
| 65 | Tetrasodium Salt of 1,2,4,5 Benzenetetracarboxylic Acid |
| 73 | Potassium Salt of Glyoxylic Acid |
| 85 | Sodium Salt of Anthranilic Acid |
| 90 | Disodium Salt of Adipic Acid |

Various chemical compounds may be mixed in varying ratios to form mixed crystals which span different ranges from what might be secured if only pure compounds were used. Inorganic compounds such as sodium nitrate may be used, of course, for R.H.-indication as well as organic compounds.

Various additives may be included in the salt solutions to be applied to the carrier substrates. Dyestuffs may be desired to give a particular color to the crystals for purposes of attracting attention. Antifoaming agents may prove useful in minimizing foaming during application of the surface tension salt solutions to the substrate. Various types of thickeners can be helpful, too, in giving a salt solution sufficient viscosity to allow easy "printing" onto appropriate substrates. In this latter case, especially, a material is generally selected — such as an inorganic silicate — which has no birefringence. Thus, the field stays blue-black until crystallization of the sensitive compound occurs. In some instances the thickener may be bifunctional, both thickening the solution and presenting a high surface area to increase sensitivity to R.H. change as discussed elsewhere.

Figure 6:
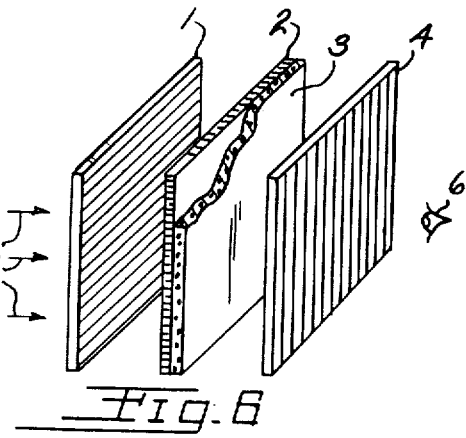
FIG. 6 illustrates another embodiment of typical transmission type such as shown in FIG. 1.

As another method of applying this invention as shown in FIG. 6, it is possible to disperse droplets of solutions of R.H.-sensitive compounds of the type described in non-aqueous vehicles of the type called lacquers and varnishes. These vehicles may then be applied to suitable substrates where, on evaporation of the non-aqueous solvent, the droplets remain encapsulated in the solidified vehicle. If vehicles are chosen having the proper moisture transmission characteristics, the encapsulated may, for example, loose its water to form birefringent crystals at suitably low R.H.s. As the R.H. rises, the crystals may then draw moisture into the droplet cavity to deliquesce and cease birefringence. Such coated substrates may be placed between polarizing elements to form hygrometers of the type described elsewhere.

The preparation of the highly preferred alkali metal salts of the 1,1,3-trimethyl-5-carboxy-3-(p-carboxyphenyl) indan compound and the 3,3',4,4'-benzophenone tetracarboxylic dianhydride compounds will be described.

To form the indan acid, an appropriate hydrocarbon can be partially oxidized by air oxidation as described in the Towle and Baldwin article "Make Most Aromatic Acids Using Mid-Century Oxidation Process", Hydrocarbon Processing, 43 (11), 149 (1964) or by chromic anhydride oxidation as described in an article by Ipatieff et al., J. Am. Chem. Soc., 70, 2123 (1948). the Ipatieff et al article describes a general procedure for the preparation of a suitable appropriate hydrocarbon by reacting an olefin such as trimethylene with p-cymene in the presence of sulfuric acid or hydrogen fluoride catalysts. U.S. Pat. No. 3,102,135 describes the production of 1-(carboxyphenyl) indane carboxylic acids and this patent, as well as the Towle et al. and Ipatieff et al articles, are incorporated by reference.

The preparation of 3,3',4,4'-benzophenone tetracarboxylic dianhydride is described in U.S. Pat. No. 3,078,279 and U.S. Pat. No. 3,297,727 describes methods of obtaining relatively pure benzophenone dianhydride. These patents are incorporated by reference.

In general carboxy substituted diaryl ketones can be prepared from diarylmethanes such as para ditolyl methane by oxidation thereof with air at an elevated temperature and pressure, for example, 90°C. and 45 pounds per square inch gauge, to obtain benzophenone 4,4'-dicarboxylic acid as described in McCracken et al. U.S. Pat. No. 3,075,007. A variety of diarylketone carboxylic acids may be prepared by subjecting to oxidation with nitric acid having an initial concentration of about 5 to about 70 percent, at a temperature of about 110 to 350°C. for about 1 minute to 48 hours a 1,1-diarylalkane represented in general by the following structural formula:

wherein R and $R_1$ are aryl groups carrying as nuclear substituents alkyl radicals having from one to eight carbon atoms and $R_2$ is an alkyl radical having from one to eight carbon atoms, the molar ratio of said nitric acid calculated as 100 percent nitric acid, to said diarylalkane being about 8.0 to about 17.0.

The preparation of the alkali metal salts of the previously mentioned benzophenone dianhydride and the benzophenone 4,4'-dicarboxylic acid follows.

Preparation of the Lithium and Potassium Salts of Carboxy Substituted Diaryl Ketones

EXAMPLE I 27.0 grams of benzophenone 4,4'-dicarboxylic acid was agitated in 200 grams distilled water to give a smooth slurry. To this was added 8.4 grams lithium hydroxide monohydrate dissolved in 50 grams distilled water. While agitating, the mass was warmed to 150°F, and held until the suspended material had reacted to form a clear solution of the di-lithium salt, normally about 15 minutes. The solution was then filtered through No. 40 filter paper to remove any traces of dust, etc. and cooled. The solution could be used in this form as a coating agent for glass, cellulose triacetate, polymethylmethacrylate or similar substrates in order to form an R.H.-responsive film after drying. Or if a more sensitive final film was desired (as described elsewhere), to the filtered solution 17.0 grams of a suitable inorganic compound having a high surface area, as for example a pyrogenic silica, was added and dispersed. A high-shear mixer such as a Waring Blender is suitable for dispersion of the silica. The thickened salt solution can then be used as a coating agent just as the clear filtered solution can be.

EXAMPLE II 35.8 grams of benzophenone 3,3',4,4'-tetracarboxylic acid (or 32.2 grams of benzophenone 3,3',4,4'-tetracarboxylic dianhydride) was agitated in 400 grams of distilled water to give a smooth slurry. To this was added 22.4 grams potassium hydroxide dissolved in 50 grams distilled water. While being agitated the suspension was warmed to 150°F. and held until the acid (or anhydride) had reacted to form a solution of the tetra-potassium salt. This takes 10-15 minutes. The solution was then filtered through No. 40 filter paper to remove any traces of insoluble impurities.

The preparation of the alkali metal salts of the previously described indan compound is illustrated by the example that follows:

Preparation of the Sodium Salt of Phenylindan Dicarboxylic Acid

Example III 32.4 grams of 1,1,3-trimethyl-5-carboxy-3-(p-carboxyphenyl)indan was agitated in 300 grams distilled water to give a smooth suspension. To this was added 8.0 grams sodium hydroxide dissolved in 30 grams distilled water. While being stirred the suspension was warmed to 150°F. and held approximately 15 minutes while the acid reacted to form the di-sodium salt. The solution was filtered through No. 40 filter paper to give a clear solution ready for coating onto suitable substrates to form an R.H.-responsive film.

Other alkali metal salts including the rubidium and cesium salt can be prepared in place of the particular lithium, potassium or sodium salt illustrated in Examples I, II and III. Substantially equivalent results can be obtained with such alkali metal salts.

What is claimed is:

1. A visual-type humidity and temperature responsive device comprising: (1) a source of illumination providing a light beam, (2) a chemical composition that of itself senses changes in temperature and relative humidity, the composition being birefringent at a first relative humidity and temperature and non-birefringent at a second relative humidity and temperature, (3) means to amplify observable changes in composition due to changes in relative humidity and temperature including a polarizer for the light beam and an analyzer for the polarized beam that is passed through the composition, and (4) light detecting means for detecting changes in the brightness and intensity of light coming from the composition because of changes in relative humidity and temperature.

2. A device as defined in claim 1 in which the composition comprises a compound having at least two rings in its structure and at least one polar group whose alkali salts furnish ions to hydrate.

3. A device as defined in claim 2 in which the polar group is a member selected from the group consisting of hydroxyl, carboxyl and sulfonic radicals.

4. A device as defined in claim 1 in which the composition comprises a compound having at least two benzene rings in its structure and polar groups whose mixed alkali metal salts furnish ions to hydrate.

5. A device as defined in claim 1 in which the composition comprises an alkali metal salt of 3,3',4,4'-benzophenone tetracarboxylic dianhydride.

6. A device as defined in claim 1 in which the device is a transmission type in which the light beam passes through the polarizer and the polarized light beam passes through the composition, where it is doubly refracted at the first relative humidity and temperature, and the emerging refracted beam passes through the analyzer.

7. A device as defined in claim 1 in which the device is a reflective-type, the light beam passing through the polarizer and the chemical composition to a mirror and then being reflected back through the composition and the analyzer.

8. A visual-type humidity and temperature responsive device comprising: (1) a source of illumination providing a light beam, (2) a chemical composition that of itself senses changes in tempereature and relative humidity, the composition being birefringent at a first relative humidity and temperature and non-birefringent at a second relative humidity and temperature, (3) means to amplify observable changes in the composition due to changes in relative humidity and temperature including a polarizer for the light beam and an analyzer for the polarized beam that is passed through the composition, and (4) light detecting means for detecting chanbes in the brightness and intensity of light coming from the composition because of changes in relative humidity and temperature.

* * * * *